United States Patent
Greer et al.

(10) Patent No.: US 6,247,048 B1
(45) Date of Patent: Jun. 12, 2001

(54) METHOD AND APPARATUS FOR TRANSCODING CHARACTER SETS BETWEEN INTERNET HOSTS AND THIN CLIENT DEVICES OVER DATA NETWORKS

(75) Inventors: Russell S. Greer, Los Gatos; Bruce K. Martin, Jr., Palo Alto; Bruce V. Schwartz, San Mateo; Lawrence M. Stein, San Jose, all of CA (US)

(73) Assignee: Openwave Systems Inc, Redwood City, CA (US)

( * ) Notice: Subject to any disclaimer, the term of this patent is extended or adjusted under 35 U.S.C. 154(b) by 0 days.

(21) Appl. No.: 09/071,216

(22) Filed: Apr. 30, 1998

(51) Int. Cl.[7] .................................................. G06F 15/16
(52) U.S. Cl. .......................... 709/219; 709/203; 709/217; 709/227; 709/228; 709/230
(58) Field of Search ..................................... 709/203, 217, 709/219, 227, 228, 230

(56) References Cited

U.S. PATENT DOCUMENTS

| | | | |
|---|---|---|---|
| 5,666,530 | * 9/1997 | Clark et al. | 707/201 |
| 5,673,322 | * 9/1997 | Pepe et al. | 380/49 |
| 5,727,159 | * 3/1998 | Kikinis | 709/246 |
| 5,751,957 | * 5/1998 | Hiroya et al. | 709/203 |
| 5,778,213 | * 7/1998 | Shakib et al. | 395/500 |
| 5,784,544 | * 7/1998 | Stevens | 395/112 |
| 5,787,452 | * 7/1998 | McKenna | 707/536 |
| 5,790,800 | * 8/1998 | Gauvin et al. | 709/227 |
| 5,793,381 | * 8/1998 | Edberg et al. | 345/467 |
| 5,826,025 | * 10/1998 | Gramlich | 709/217 |
| 5,862,481 | * 1/1999 | Kulkarni et al. | 455/432 |
| 5,918,013 | * 6/1999 | Mighdoll et al. | 709/217 |
| 5,940,845 | * 8/1999 | Prager et al. | 707/536 |
| 5,963,155 | * 10/1999 | Cheng et al. | 341/90 |

OTHER PUBLICATIONS

"HDTP Specification," *Unwired Planet, Inc.*, Version 1.1, Part No. HDTP–SPEC–DOC–101, Jul. 15, 1997, pp. 1–40.
"HDML 2.0 Language Reference," *Unwired Planet, Inc.*, Version 2.0, Part No. HDMLREF–DOC–200, Revision D, Jul. 1997, pp. 1–56.

* cited by examiner

*Primary Examiner*—Saleh Najjar
(74) *Attorney, Agent, or Firm*—Dag Johansen; Joe Zheng

(57) ABSTRACT

The present invention discloses a system for transcoding character sets between Internet hosts and thin client devices over data networks. A proxy server is provided as an intermediary between the Internet hosts and the thin client devices, and is informed when a specific character set is preferred by the client device. The client character set preference is communicated to the proxy server prior to the client receiving information from an Internet host. When a communication session is established between one of the Internet hosts and one of the thin client devices, the proxy server performs the character set transcoding if the character sets of the Internet host and the client device are not the same. Apart from any existing techniques, the proxy server handles the task of character set transcoding so as to alleviate the mobile computing devices from performing the transcoding locally.

24 Claims, 5 Drawing Sheets

METHOD AND APPARATUS FOR TRANSCODING CHARACTER SETS BETWEEN INTERNET HOSTS AND THIN CLIENT DEVICES OVER DATA NETWORKS

FIELD OF THE INVENTION

The present invention relates to client and server computing systems. In particular, the present invention discloses a method and apparatus for transcoding character data between a plurality of wireless computer devices and a plurality of host computer systems that use different character sets.

BACKGROUND OF THE INVENTION

The Internet is a rapidly growing communication network of interconnected computers around the world. Together, these millions of connected computers form a vast repository of hyperlinked information that is readily accessible by any of the connected computers from anywhere at any time. To provide mobility and portability to the Internet, wireless computing devices have been introduced. The wireless computers are capable of communicating with the computers on the Internet using wireless data networks connected to the Internet. With wireless computers using wireless data networks, people are able to travel about and yet perform the same tasks they could do with computers directly connected the Internet.

The most common wireless access paradigm of today is a laptop personal computer equipped with a wireless communication mechanism. For example, a laptop may be equipped with a wireless modem for communication with the Internet. This paradigm may be useful for a considerable number of applications and users, but there has been a growing need for a mobile paradigm in which the Internet can be instantly accessed by smaller mobile computing devices such as mobile phones and Personal Digital Assistants (PDAs). With increasing data processing capabilities in the new smaller mobile computing devices, more and more users are carrying such devices around to convert unproductive time into productive time.

Many networked computers, however, use different character character sets. For example, most web servers in the United States use the US-ASCII character set to represent English while web servers in Japan often use Shift-JIS (Shift-JIS ISO-2022-JP) or UNICODE to represent Japanese. Many web browsers, such as Netscape Navigator by Netscape Corporation or Internet Explorer by Microsoft Corporation provide utilities to perform transcoding of character sets, when a client device and a server device communicate in different character sets. However, the client device, such as a desktop personal computer, equipped with a web browser has sufficient computing resources, such as a fast processor and ample memory, to perform the transcoding locally without sacrificing performance noticeably.

To increase portability and mobility, most mobile computing devices, however, are designed small in size, light in weight, low in power consumption, and as economical and portable as possible. Such "thin" designs often have very limited computing resources. These designs typically have the equivalent of less than one percent of the computing power provided in a typical desktop or portable computer, and memory capacity of less than 250 kilobytes. Such thin client devices would not have sufficient computing resources to perform the character set transcoding locally. There is thus a great need for providing the thin client devices with a mechanism to communicate with servers that use a different character set than thin client device.

SUMMARY OF THE INVENTION

The present invention has been made in consideration of the above described problems and needs, and has particular application to navigation of Internet web pages using a two-way interactive communication device, such as a mobile device, a mobile phone, a landline telephone, or an Internet capable remote controller. The present invention discloses a system for transcoding character sets between Internet hosts and thin client devices over data networks. A proxy server is provided as an intermediary between the Internet hosts and the thin client devices, and is informed that a specific character set preferred when a communication session is established between one of the Internet hosts and one of the thin client devices. If the character set used by the host and by the thin client device is not the same, the proxy server performs the character set transcoding. The proxy server handles the task of character set transcoding so as to alleviate the mobile computing devices from performing the transcoding locally.

Accordingly, an important object of the present invention is to provide a generic solution for alleviating thin client device from performing character set transcoding locally.

Other objects, together with the forgoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid obscuring aspects of the present invention.

The detailed description of the present invention is presented largely in terms of procedures, steps, logic blocks, processing, and other symbolic representations of data processing devices coupled to networks. These process descriptions and representations are the means used by those experienced or skilled in the art to most effectively convey the substance of their work to others skilled in the art. The present invention is a method and apparatus for transcoding character sets between Internet hosts and thin client devices over a data network. The method and apparatus described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

A Wireless Data Network

Figure 1:
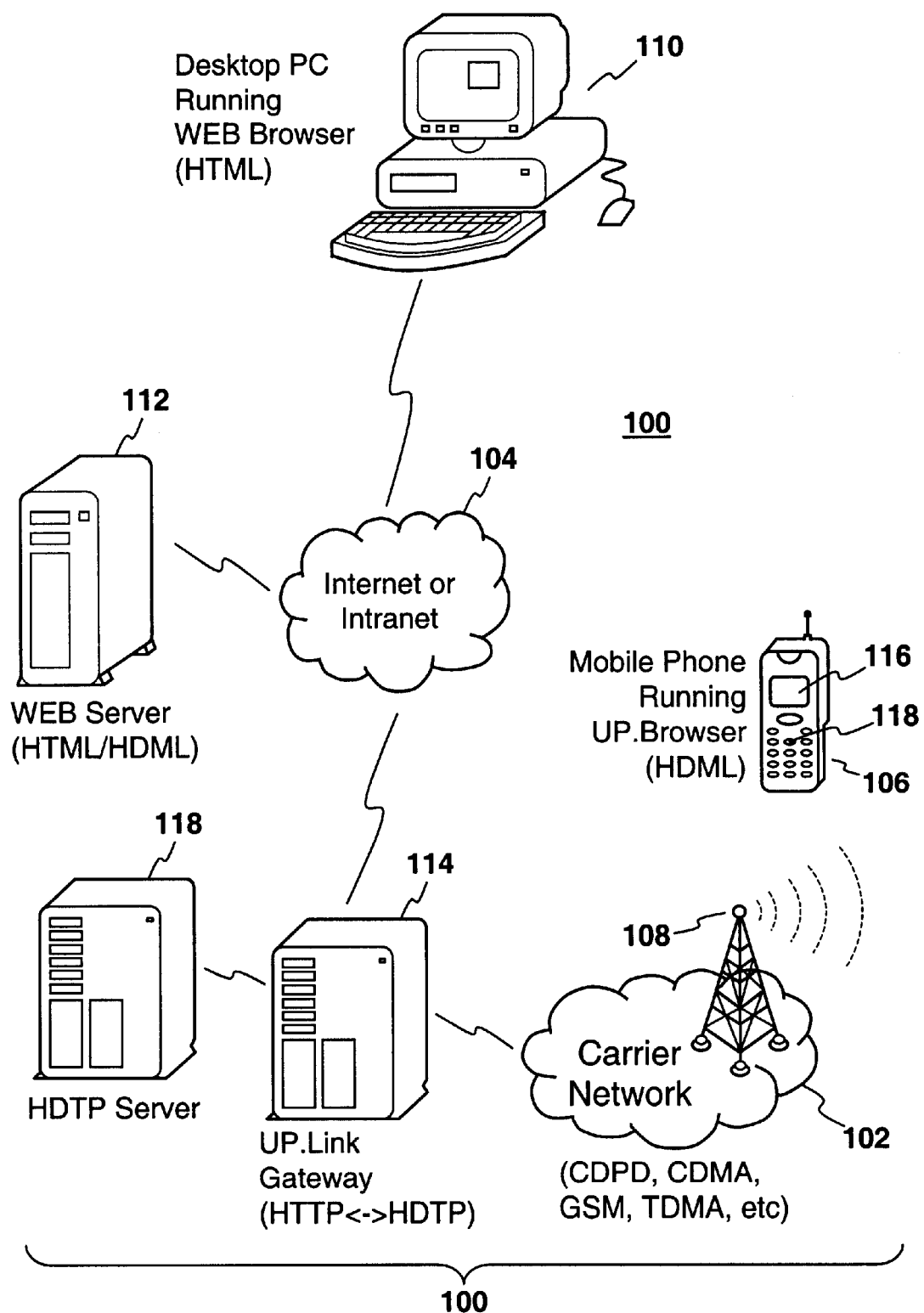
FIG. 1 illustrates a schematic representation of a mobile data network in which the present invention may be practiced.

Referring now to the drawings, in which like numerals refer to like parts throughout the several views, FIG. 1 shows a schematic representation of a data network 100 in which the present invention may be practiced. The data network 100 comprises an airnet 102 that is generally called wireless network and a landnet 104 that is generally a landline network, each acting as a communication medium for data transmission therethrough.

The airnet 102, in which the data transmission is via the air, is sometimes referred to as a carrier network because each airnet is controlled and operated by a telecommunications carrier such as AT&T or GTE. Each telecommunications carrier my have its own communication scheme, such as CDPD, CDMA, GSM and TDMA for the airnet 102. The landnet 104 may be the global Internet, an Intranet, or another private network. The terms landnet, internet and intranet will hereinafter be used interchangeably.

Mobile computing device 106 may be a cellular phone or Personal Digital assistant capable of communicating with the airnet 102 via an antenna 108. It is generally understood that the airnet 102 communicates simultaneously with a plurality of two-way mobile communication devices, of which only one example mobile computing device 106 is shown in FIG. 1. Similarly, connected to the Internet 104 are a plurality of desktop personal computers (PCs) 110 and a plurality of server computers 112, though only one representative respectively is shown in FIG. 1. The PC 110, as shown in the figure, may be a personal computer SPL 300 from NEC Technologies Inc. The PC 110 may execute a HyperText Markup Language (HTML) Web browser such as Netscape Navigator or Microsoft Internet Explorer to access information on the Internet 104 using HyperText Transport Protocol (HTTP). For example, the PC 110 may access HTML information stored in the web server 112 that may be a workstation from Sun Microsystems Inc. It is understood to those skilled in the art that the PC 110 can store accessible information therein so as to become a web server as well.

Between the Internet 104 and the airnet 102 there is a link server or proxy server computer 114 for performing data communication between the Internet 104 and the airnet 102. The proxy server computer 114, also referred to as link server computer or gateway server computer, may be a workstation or a personal computer that performs mapping and translation functions. For example, the proxy server computer 114 may map information from one protocol to another, such that the mobile device 106 can communicate with any one of the servers 112 or the PCs 110 on the internet 104.

One communication protocol used on the Internet 104 is the well known HyperText Transfer Protocol (HTTP) or HTTPS, a secure version of HTTP. HTTP uses the well known Transport Control Protocol (TCP) to build a connection for carrying HyperText Markup Language (HTML) information. For example, an HTML Web browser in the proxy server 114 may access HTML information stored in the Web server 112.

In the embodiment of FIG. 1, the communication protocol between the mobile device 106 and the proxy server 114 via the airnet 102 is the Handheld Device Transport Protocol (HDTP) which preferably runs on User Datagram Protocol (UDP). The HDTP controls the connection of a small Web browser in the mobile device 106 to the proxy server 114. In the embodiment of FIG. 1, the browser in the mobile device 106 may be a Handheld Device Markup Language (HDML) browser. The Handheld Device Markup Language (HDML) is similar to HTML in that it is a tag based document language and comprises a set of commands or statements that specify how information is to be displayed on a display device. HDML is a specific markup language designed to specify in a "card" how information should be displayed on a small display screen 116 of the mobile device 106. Normally a number of cards are grouped into a deck that is the smallest unit of HDML information that can be exchanged between the mobile device 106 and the proxy server 114. More description on the HDML cards and deck will be described below wherever appropriate. The specifications of HDTP, entitled "HDTP Specification" and HDML, entitled "HDML 2.0 Language Reference" are hereby incorporated herein by reference.

The HDTP is a session-level protocol that resembles the HTTP, but is optimized for use in thin devices that have significantly less computing power and memory. Further it is understood to those skilled in the art that the User Datagram Protocol (UDP) does not require a connection to be established between a client device and a server device before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

A Wireless Computing Device

Figure 2:
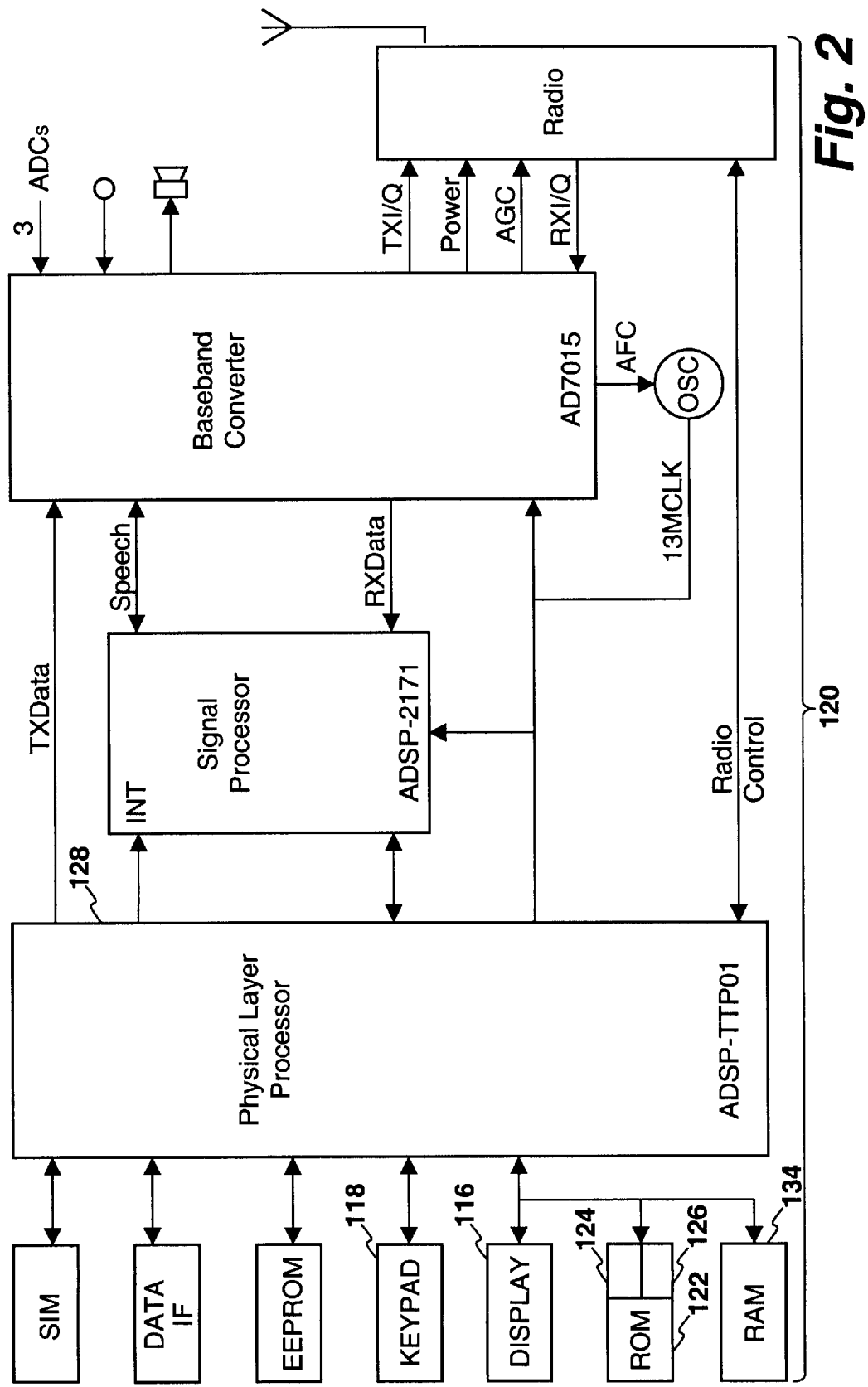
FIG. 2 illustrates a typical example of a mobile computing device that may be used with the present invention.

FIG. 2 show a block diagram of a typical GSM digital mobile phone 120 that can be used as a mobile computing device in the system of FIG. 1. Each of the hardware components in the digital mobile phone 120 are known to those skilled in the art and so the hardware components are not to be described in detail herein. With the display screen 116 and the keypad 118, a user of the phone 120 can interactively communicate with a server device (not shown in FIG. 2) over the data network.

According to one embodiment of the present invention, compiled and linked computer programs are stored in ROM 122 as a client module 124 and support module 126. Upon activation of a predetermined key sequence utilizing the keypad 118, a physical layer processor or microcontroller 128 initiates a communication session request to a server device (not shown) using the client module 124 in the ROM 122. Upon establishing the communication session, the phone 120 typically receives a single HDML deck (hereinafter "deck") from the server device and stores the deck as cached in RAM 134. An HDML deck is the smallest unit of HDML information that can be exchanged between a thin client device and a server device. Each deck has a unique address identifier such as a URL and includes one or more cards. A card includes the information required to generate a screen display on the display screen 116. Thus, a deck is simply a group of screen displays. The number of cards in a deck is selected to facilitate efficient use of the resources in the mobile device and in the airnet network. A display driver (not shown) receives and interprets information from the deck in the RAM 134 and causes the screen 116 to display the information accordingly. The keypad driver (not shown) receives signals representing what buttons or keys in the keypad 118 are depressed and converts the signals to a representation understood by the microcontroller 128 that in turn responds, for example, by activating a respective card in the deck or a new link to the server for a new deck if necessary depending on what choice is made through the phone keypad 118.

Proxy Transcoding

To preserve computing and memory resources, most mobile computing devices support one single character set such as ASCII, Shift-JIS, or UNICODE (UTF-8). Thus, a mobile computing device that only supports a single character set can only communicate with computer servers that use the same character set. Although this system improves the performance and limits cost, the usefulness of the mobile computing device is limited since it cannot communicate with servers that do not use the same character set. In other words, those mobile computing devices supporting US-ASCII (for English) are not able to communicate linguistically with servers using Shift-JIS (Japanese). To expand the utility of mobile computing devices, the present invention introduces a proxy transcoder.

Figure 3:
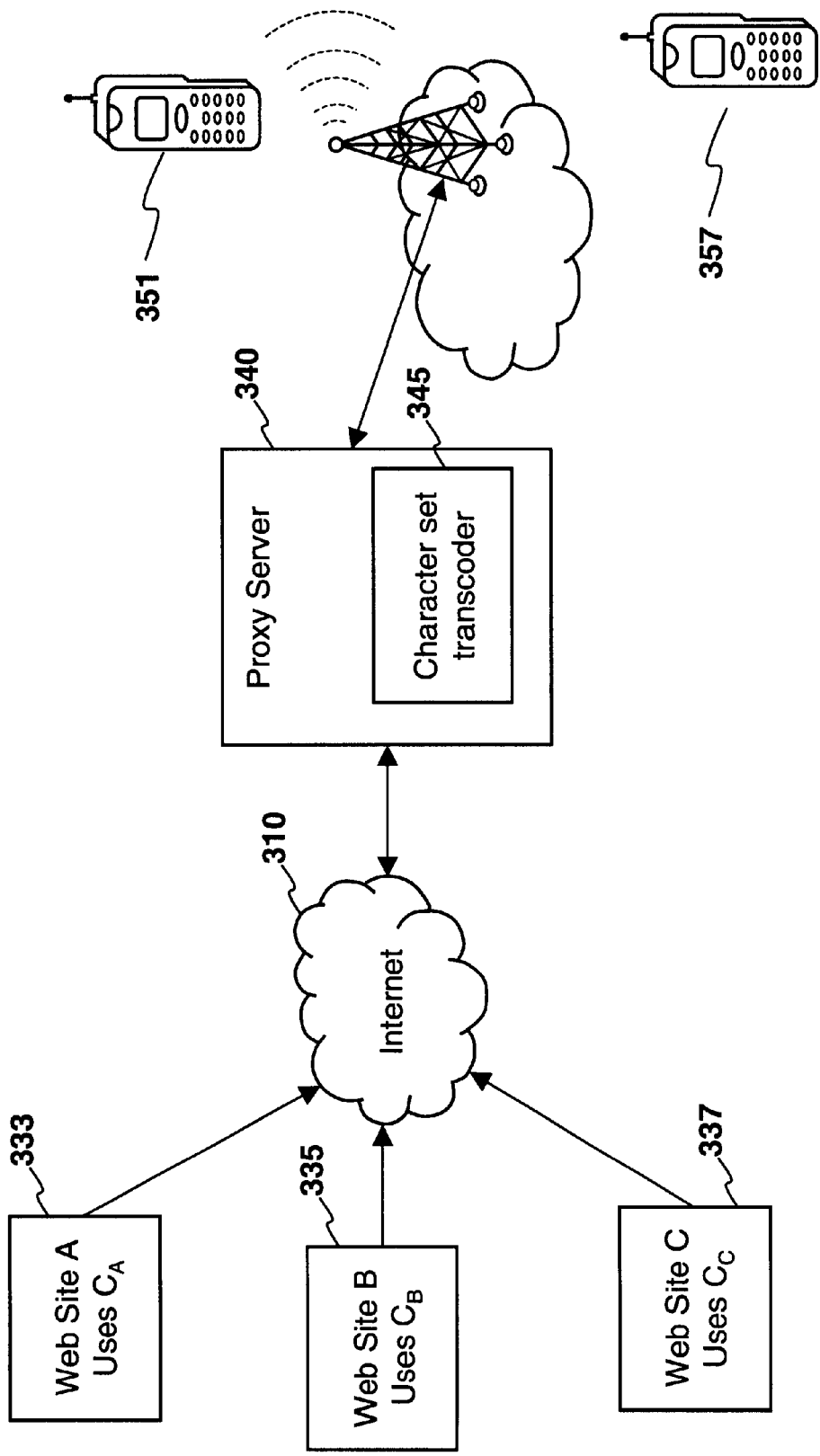
FIG. 3 illustrates a systemic configuration in which the present invention may be practiced, the configuration comprises a plurality mobile computing devices communicating with a plurality of computer hosts through a proxy server that performs character set transcoding.

Referring to FIG. 3, there is shown an exemplary embodiment of the proxy transcoder system. As illustrated, there are a plurality of mobile computing devices such as mobile computing devices 351 and 357, which can be two-way interactive communication devices such as mobile phone with a display screen. Wireless mobile computing devices 351 and 357 communicate across a wireless data network to a proxy server 340. The proxy server 340 serves as an intermediary between the wireless communication devices and Internet 310. Thus, wireless mobile computing devices 351 and 357 can communicate with servers coupled to Internet 310 through proxy server 340.

In the embodiment of FIG. 3, there are three different web servers: web server A 333, web server B 335, and web server C 337. Each of the web servers uses a different character set. Specifically, web server A 333 uses character set $C_A$, web server B 335 uses character set $C_B$, and web server C 337 uses character set $C_C$. To allow the mobile computing devices 351 and 357 to properly communicate with the different web servers, proxy server 340 includes a character set transcoder 345 that is responsible for ensuring that communication to each associated computing device is in the proper character set. The character set transcoder may be provided from Global C by Uniscape, Inc. located at 303 Twin Dolphin Drive, Suite 510, Redwood Shores, Calif. 94065. It should be noted that one of the key features in the present invention, is that the proxy server 340 handles the task of character transcoding so as to alleviate the mobile computing devices from performing character set transcoding satisfactory performance.

The mobile computing devices 351 and 357 may use the same or different character sets. When one of the mobile computing devices 351 or 357 opens a communication session with the proxy server 340, the mobile computing device informs the proxy server 340 as to what type of character set the computing device uses. This session character set is registered in the proxy server 340 such that all subsequent communication between the proxy server 340 and the mobile computing device is in the specified character set. Thus, when a mobile computing device communicates with an Internet server through the proxy server 340, the character set transcoder 345 transcodes data from the Internet server into the character set used by the mobile computing device.

The mobile computing devices 351 and 357 may also specify the character set to be used during each communication made with the proxy server 340. Specifically, any request made by mobile computing device 351 or 357 may specify a character set that should used in any response. Thus, the mobile computing device may override the session character set on a request-by-request basis. Furthermore, if for some reason no character set was set during the session creation, the character set specified in each request will be used.

A Transcoding Example Using a GET Request

Figure 4:
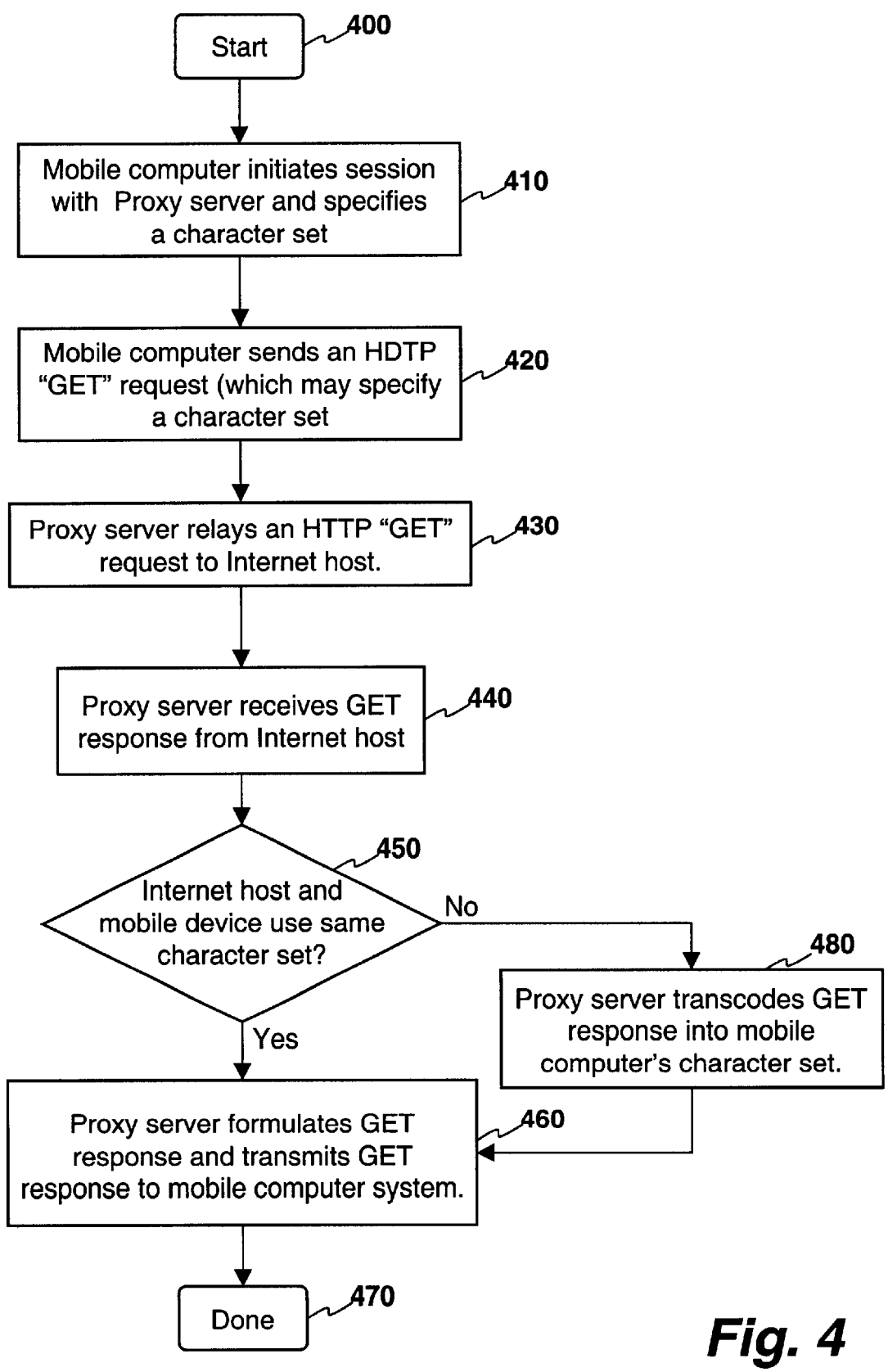
FIG. 4 illustrates a flow diagram of steps performed when a proxy server transcodes a GET request and response.

One of the most commonly used client requests in the Handheld Device Transport Protocol (HDTP) and the HyperText Transport Protocol (HTTP) is the "GET" request. The GET request specifies a Uniform Resource Locator of data that the client wishes to receive. FIG. 4 shows a flowchart of performing character set transcoding when a mobile computing device makes a GET request.

It is understood that a communication session must be established between a mobile computing device and a proxy server prior to a GET request. To illustrate a complete process, at 410, a mobile computing device initiates a request to establish a communication session with the proxy server. The request comprises necessary information about the mobile computing device, such as a device identification or an assigned phone number. Additionally, the necessary information include the character set information that the mobile computing device uses. Thus when establishing the communication session, the mobile computing device informs the proxy server as to which character set should be used when communicating with that particular mobile computing device. The proxy server records the specified character set in a record associated with the established session. It should be noted, however, that the character set information does not have to be sent when the session is being created, this is not an implied limitation of the present invention. The character set, set at session creation, is for optimal efficiency according to one embodiment. It can be set in each request, e.g. a GET or POST request.

At 420, the mobile computing device issues an HDTP GET request. The GET request often specifies a URL that the client device wishes to access. The GET request may also specify a character set that should be used when the proxy server responds to the get request. Thus, the mobile computing device can override the session character set. The proxy server translates the HDTP GET request into a properly formatted HTTP GET request. It is understood that each HDTP GET or POST request directly maps to an HTTP GET or POST request, respectively. Ancillary request information, in the form of headers such as Content-Language, is directly mapped between HDTP and HTTP. The proxy server then issues the HTTP GET request to the desired server on the Internet at 430.

The web server that received the GET request will formulate a response to the GET request. After the web server transmits the response, the proxy server receives the response as stated at step 440.

At step 450, the character set transcoder will test to see if the character set used in the response is the same character set used by the mobile computing device. If the character set is the same, then no transcoding is needed. However, if the character sets do not match, then the character set transcoder 345 transcodes the response from the Internet server into the character set used by the mobile computing device at 480. The character set used by the mobile computing device was set during the session creation or specified in the GET request.

After the transcoding (if necessary), a response from the web server is then formatted into a response for the mobile computing device and forwarded to the mobile computing device at 460. Note that the creation of a response to the mobile computing device must occur after the transcoding since the transcoding operation may affect the length of the message.

A Transcoding Example Using a POST Request

Both HTTP and HDTP use a "POST" request to send information from a client device to a server device. However, before two computer systems can communicate using the POST request, the receiving computer usually specifies a desired character set to the sending computer. In HDML, this is performed using the following HDML card:

<ACTION TYPE=ACCEPT TASK=POST DEST="/submit"

POSTDATA="$(x)&$(y)"

ACCEPT-CHARSET="utf-8">

In HTTP, the desired character set is specified as a parameter in a FORM element that is provided in a GET response. Specifically, a FORM element includes the attribute or markup:

accept-charset=charset list

The accept-charset attribute specifies the list of character encodings for input data that must be accepted by the server processing this form. The value is a space- and/or comma-delimited list of charset values. The server must be able to accept any single character encoding per entity received. Once a client knows the character set accepted by a server, the client can then post data to the server.

To be more specific, the following code illustrates an example of how a mobile computing device uses a "POST" request to send information to a web server device, wherein the markup, accept-charset, specifies the character set for the target Internet host, i.e. the host character set.

<HDML version=3.0 ttl=0>

<CHOICE>

<CE task=go dest="log.cgi" postdata="x=1&y=2">Simple post

<CE task=go dest="log.cgi" postdata="x=1&y=2" accept-charset=Shift-JIS>Post w/charset <CE task=go dest="log.cgi" postdata="x=1&y=2&k=%f1"

</CHOICE>

</HDML> wherein the markup, accept-charset, is set to be Shift-JIS. Also in the above example, the post data is hardcoded. Often, the post data can be sent as HDML variables via an ENTRY or CHOICE card.

Figure 5:
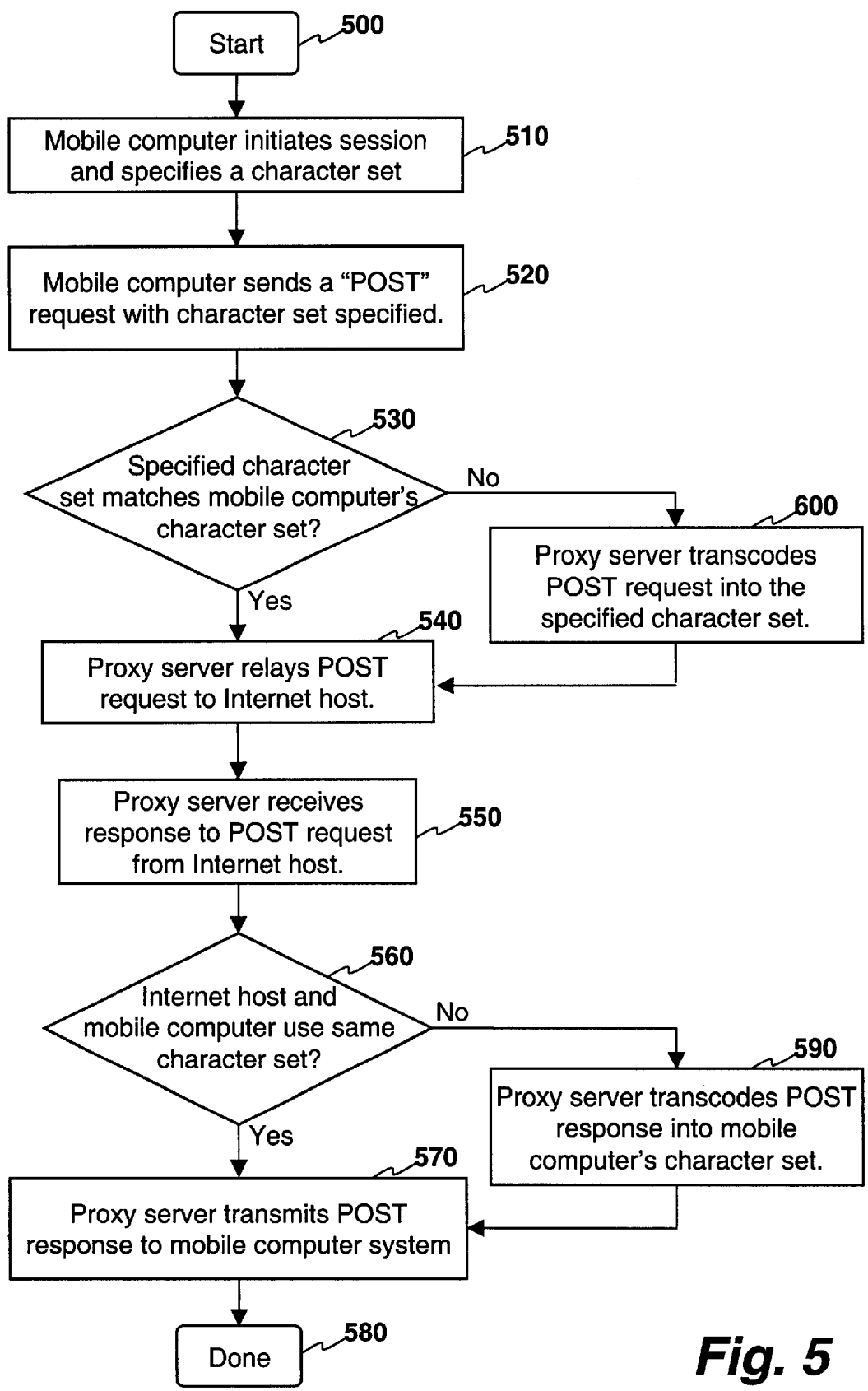
FIG. 5 illustrates a flow diagram of steps performed when a proxy server transcodes a GET request and response.

FIG. 5 illustrates how the proxy transcoder of the present invention assists when a mobile computing device issues a POST request. At 510, a mobile computing device first initiates to establish a communication session with the proxy server. When establishing a session, the mobile computing device informs the proxy server as to which character set should be used when communicating with that particular mobile computing device (the client character set). The proxy server stores the mobile computing device specified character set in a record associated with the session. Again it should be noted that the character set information does not have to be sent when the session is being created. The character set, set at session creations is for optimal efficiency according to one embodiment. It can be set in each request.

Next, at 520, the mobile computing device issues an HDTP POST request to a proxy server. The HDTP POST request specifies a target Internet host (a web server) and data to transmit to that target host. The HDTP POST request also includes a parameter that specifies the character set that should be used when communicating to the target internet host (The host character set). This character set is the character set obtained from the accept-charset attribute in an HTML FORM or an HDML card.

At 530, the character set transcoder tests to see if the character set specified in the POST request (the host character set) is the same character set used by the mobile computing device (the client character set). If the character set is the same, then no transcoding is needed. However, if the character sets do not match, then the character set transcoder transcodes the data in the POST request into the character set specified in the POST request at 600. After the transcoding (if necessary), the proxy server then formats the HDTP POST request into an HTTP post request and transmits the HTTP POST request at 540.

The target Internet host will respond to the HTTP POST request. At 550, the proxy server receives a response to the POST request. At 560, the character set transcoder will test to see if the character set used in the response is the same character set used by the mobile computing device (the client character set). If the character sets are the same, then no transcoding is needed. However, if the character sets do not match, then the character set transcoder transcodes the response from the internet server into the character set used by the mobile computing device at 590. The response from the internet host is then formatted into an HDTP response for the mobile computing device and sent to the mobile computing device at 570.

It should be noted that, in the above examples, two responses, one for a GET request and the other for a POST request are respectively recited in correspondence to GET and POST requests. However, it is understood to the users that there are no specific types associated with the responses. Further, it should be noted that the mobile computing device specifies the character set that will be used in the HTTP POST request sent to the target Internet host. The mobile computing device can thus select the character set that is used when communicating information to a target Internet host. In most situations, the mobile computing device will use the character set used by the target Internet host in the GET response that included the POST receiving computer's charset data. Moreover, the data from a previous response may cause the mobile computing device to generate a POST request to a second Internet host. In such a situation, the mobile computing device may specify the character set of the second Internet host.

The present invention has been described in sufficient detail with a certain degree of particularity. It is understood, to those skilled in the art, that the present disclosure of embodiments has been made by way of example only, and that numerous changes in the arrangement and combination of parts as well as steps may be resorted to without departing from the spirit and scope of the invention as claimed. Accordingly, the scope of the present invention is defined by the appended claims rather than the forgoing description of one embodiment.

What is claimed is:

1. A method for transcoding character sets in a proxy server device situated between a plurality of client devices that use different character sets on a first network and a plurality of different servers that use different character sets on a second network, said method comprising:

receiving a client request from a client device in said proxy server device across said first network, said client request using a first communication protocol;

translating said client request from said first communication protocol to a second communication protocol;

relaying said client request from said proxy server device to a first server device on said second network using said second communication protocol;

receiving a response from said first server device in said proxy server;

transcoding said response from a second character set used by said first server device to a first character set used by said client device if said first character set is not the same as said second character set;

translating said response from said second communication protocol to said first communication protocol used by said client device; and relaying said response to said client device.

2. The method as recited in claim 1 further comprising:

receiving a specification of said first character set from said client device in said proxy server across said first network.

3. The method as recited in claim 2 wherein said specification of said first character set used by said client device is specified by said client device when opening a communication session with said proxy server device.

4. The method as recited in claim 2 wherein said specification of said first character set is contained in said client request.

5. The method as recited in claim 1, wherein said client request comprises a request to get information from said first server device.

6. The method as recited in claim 5, wherein said first communication protocol is Handheld Device Transfer Protocol (HDTP) and wherein said client request is a HDTP GET request.

7. The method as recited in claim 1, wherein said second communication protocol is HyperText Transfer Protocol (HTTP).

8. The method as recited in claim 7, wherein said relaying said client request from said proxy server device to said first server device comprises translating said client request to an HTTP request transportable in said second communication protocol.

9. The method as recited in claim 1 wherein said client request comprises a request to post information to said first server device.

10. The method as recited in claim 9 wherein said first communication protocol is Handheld Device Transfer Protocol (HDTP) and wherein said client request is an HDTP POST request.

11. The method as recited in claim 1 further comprising:

receiving a specification of said second character set used by said first server device in said client request.

12. The method as recited in claim 11 further comprising:

opening a session with said proxy server from said client device and specifying said first character set used by said client device when opening said session.

13. A system containing program code for transcoding character sets in a proxy server device situated between a plurality of client devices that use different character sets on a first network and a plurality of different servers that use different character sets on a second network, said system comprising:

a first program code for receiving a client request from a client device in said proxy server device across said first network using a first communication protocol;

a second program code for translating said client request from said first communication protocol to a second communication protocol;

a third program code for relaying said client request from said proxy server device to a first server device on said second network using said second communication protocol;

a fourth program code for receiving a response from said first server device on said second network in said proxy server device;

a fifth program code for transcoding said response from a second character set used by said first server device to a first character set used by said client device if said first character set is not the same as said second character set;

a sixth program code for translating said response from said second communication protocol to said first communication protocol used by said client device; and a seventh program code for relaying said response to said client device.

14. The system as recited in claim 13 further comprising:

an eighth program code for receiving a specification of said first character set from said client device in said proxy server device across said first network.

15. The system as recited in claim 14 wherein said specification of said first character set by said client device occurs when opening a communication session.

16. The system as recited in claim 14 wherein said specification of said first character set is contained in said client request.

17. The system as recited in claim 13, wherein said client request comprises a request to get information from said first server device.

18. The system as recited in claim 17, wherein said first communication protocol is Handheld Device Transfer Protocol (HDTP) and wherein said client request is a HDTP GET request.

19. The system as recited in claim 13, wherein said second communication protocol is HyperText Transfer Protocol (HTTP).

20. The system as recited in claim 19, wherein said second program code comprises program code for translating said client request to an HTTP request transportable in said second communication protocol.

21. The system as recited in claim 13 wherein said client request comprises a request to post information to said first server device.

22. The system as recited in claim 21 wherein said first communication protocol is Handheld Device Transfer Protocol (HDTP) and wherein said client request is HDTP POST request.

23. The system as recited in claim 13 further comprising:

program code for receiving a specification of said second character set used by said first server device in said client request.

24. The system as recited in claim 23 further comprising:

program code for opening a session with said proxy server from said client device; and program code for specifying said first character set used by said client device when opening said session.

* * * * *